(12) United States Patent
Doddavula

(10) Patent No.: US 8,645,529 B2
(45) Date of Patent: Feb. 4, 2014

(54) AUTOMATED SERVICE LEVEL MANAGEMENT OF APPLICATIONS IN CLOUD COMPUTING ENVIRONMENT

(75) Inventor: Shyam Kumar Doddavula, Bangalore (IN)

(73) Assignee: Infosys Limited, Bangalore (IN)

( * ) Notice: Subject to any disclaimer, the term of this patent is extended or adjusted under 35 U.S.C. 154(b) by 223 days.

(21) Appl. No.: 12/950,464

(22) Filed: Nov. 19, 2010

(65) Prior Publication Data

US 2012/0089726 A1  Apr. 12, 2012

(30) Foreign Application Priority Data

Oct. 6, 2010  (IN)  .......................... 2961/CHE/2010

(51) Int. Cl.
*G06F 15/173*  (2006.01)
(52) U.S. Cl.
USPC ........... 709/224; 709/223; 709/226; 718/104; 718/105; 718/106
(58) Field of Classification Search
USPC ........... 709/223, 224, 226; 718/104, 105, 106
See application file for complete search history.

(56) References Cited

U.S. PATENT DOCUMENTS

| | | | |
|---|---|---|---|
| 6,892,382 B1 | 5/2005 | Hapner et al. | |
| 7,039,559 B2 | 5/2006 | Froehlich et al. | |
| 7,167,821 B2 | 1/2007 | Hardwick et al. | |
| 7,392,421 B1 | 6/2008 | Bloomstein et al. | |
| 7,689,862 B1 | 3/2010 | Bharthulwar et al. | |
| 7,707,572 B2 | 4/2010 | Woollen | |
| 7,712,102 B2 | 5/2010 | Herington et al. | |
| 8,104,041 B2 * | 1/2012 | Belady et al. | 718/105 |
| 8,255,529 B2 * | 8/2012 | Ferris et al. | 709/224 |
| 2002/0129157 A1 | 9/2002 | Varsano | |
| 2003/0050932 A1 | 3/2003 | Pace | |
| 2003/0051066 A1 | 3/2003 | Pace | |
| 2004/0260602 A1 | 12/2004 | Nakaminami | |
| 2005/0240935 A1 | 10/2005 | Ramanathan | |
| 2007/0156733 A1 | 7/2007 | Meyerson | |

(Continued)

FOREIGN PATENT DOCUMENTS

GB  2410580  3/2005

OTHER PUBLICATIONS

Israr et al., "Automatic generation of layered queuing software performance models from commonly available traces," Proceedings of the 5th international workshop on Software and performance, Palma de Mallorca, Spain, pp. 147-158 (Jul. 2005).

(Continued)

*Primary Examiner* — Yves Dalencourt
(74) *Attorney, Agent, or Firm* — Klarquist Sparkman, LLP

(57) ABSTRACT

Automated service level management of applications can include automated deployment, monitoring, forecasting, and/or predicting based on a plurality of service levels comprising application level, application server platform level, virtual machine level, and/or infrastructure level, and optimizations at multiple levels using a plurality of techniques including automated dynamic application migration. Automated deployment of applications in a cloud computing environment using deployment descriptors comprises receiving values for service level parameters for an application, creating a deployment descriptor based on the parameters, identifying application servers that satisfy the deployment descriptors, and deploying the application to the identified application servers. Automated dynamic migration of applications in a cloud computing environment comprises deciding to migrate an application, obtaining application resource requirements, identifying application server candidates, selecting an application server from one of the candidates, and migrating the application.

15 Claims, 11 Drawing Sheets

(56) References Cited

U.S. PATENT DOCUMENTS

| | | | |
|---|---|---|---|
| 2007/0204266 A1 | 8/2007 | Beaty | |
| 2008/0082693 A1 | 4/2008 | Meijer et al. | |
| 2008/0222638 A1 | 9/2008 | Beaty et al. | |
| 2008/0300851 A1 | 12/2008 | Chakrabarti et al. | |
| 2009/0199196 A1* | 8/2009 | Peracha | 718/104 |
| 2009/0225763 A1 | 9/2009 | Forsberg et al. | |
| 2009/0271472 A1 | 10/2009 | Scheifler et al. | |
| 2009/0276771 A1 | 11/2009 | Nickolov et al. | |
| 2010/0125477 A1 | 5/2010 | Mousseau et al. | |
| 2011/0276951 A1* | 11/2011 | Jain | 717/140 |

OTHER PUBLICATIONS

Pu et al., "An Observation-Based Approach to Performance Characterization of Distributed n-Tier Applications," IISWC '07 Proceedings of the 2007 IEEE 10th International Symposium on Workload Characterization, 10 pages (Sep. 2007).

RightScale, Inc., "Set up Autoscaling using Alert Escalations?," <http://support.rightscale.com/03-Tutorials/02-AWS/02-Website_Edition/How_do_I_set_up_Autoscaling%3f> 13 pages (accessed Nov. 15, 2010).

ScaleOut Software, Inc., "Cloud Computing," <http://www.scaleoutsoftware.com/solutions/cloud-computing/> 2 pages (accessed Nov. 15, 2010).

Varsha Apte, "Performance Analysis of Distributed Software Systems: Approaches Based on Queueing Theory," Sixth Working IEEE/IFIP Conference on Software Architecture (WICSA'07), p. 39 (1 page) (Jan. 2007).

* cited by examiner

AUTOMATED SERVICE LEVEL MANAGEMENT OF APPLICATIONS IN CLOUD COMPUTING ENVIRONMENT

BACKGROUND

Cloud computing enables delivering information technology (IT) capabilities as on-demand services. This scalable and elastic model provides advantages like faster time to market, pay-per-use business models, etc. A key challenge in offering Cloud Computing services is being able to efficiently guarantee application service levels for quality of service characteristics like performance, scalability, availability, etc. This involves optimizing resource allocations and application configurations to provide the service level agreement (SLA) targets while reducing the associated costs.

With increasing adoption of cloud computing technologies, and as the scale of computing increases, there is an increasing need to automate aspects of cloud computing technologies, such as configuration, setup of constraints/policies on usage, governance of cloud applications, and infrastructure management. Without such automation, cloud computing technologies will become increasingly unmanageable.

Unlike traditional models which have hardwired infrastructure and deployment configurations, virtualization and cloud computing enable changes in the infrastructure layer programmatically. As a result, adoption of cloud computing provides the opportunity for automation of some of the otherwise manual activities in traditional infrastructure deployment models.

Therefore, there exists ample opportunity for improvement in technologies related to automation of application service level management using cloud computing technologies.

SUMMARY

A variety of technologies related to management of applications in a cloud computing environment are applied.

For example, a method is provided for automated service level management of applications by automated deployment of applications in a cloud computing environment using deployment descriptors, comprising receiving values for a plurality of service level parameters for an application, creating a deployment descriptor based, at least in part, on the received values for the plurality of service level parameters, identifying one or more application servers in the cloud computing environment that satisfy the deployment descriptor, and deploying the application on the one or more identified application servers to achieve service level management of the application in the cloud computing environment.

As another example, a computing device is provided for automated service level management of applications by automated deployment of applications in a cloud computing environment using deployment descriptors. The computing device can comprise a storage and a processing unit configured for performing operations comprising receiving values for a plurality of service level parameters for an application, creating a deployment descriptor based, at least in part, on the received values for the plurality of service level parameters, identifying one or more application servers in the cloud computing environment that satisfy the deployment descriptor, and deploying the application on the one or more identified application servers to achieve service level management of the application in the cloud computing environment.

In another example, a method is provided for automated service level management of applications by automated dynamic migration of applications in a cloud computing environment, comprising deciding to migrate an application, obtaining application resource requirements of the application, identifying, application server candidates that meet the application resource requirements, where the identifying comprises sorting the identified application server candidates in order of preference based, at least in part, on the application resource requirements, selecting an application server based on the sorted application server candidates, and migrating the application to the selected application server.

The foregoing and other features and advantages of the invention will become more apparent from the following detailed description, which proceeds with reference to the accompanying figures.

DETAILED DESCRIPTION OF EXEMPLARY EMBODIMENTS

Figure 1:
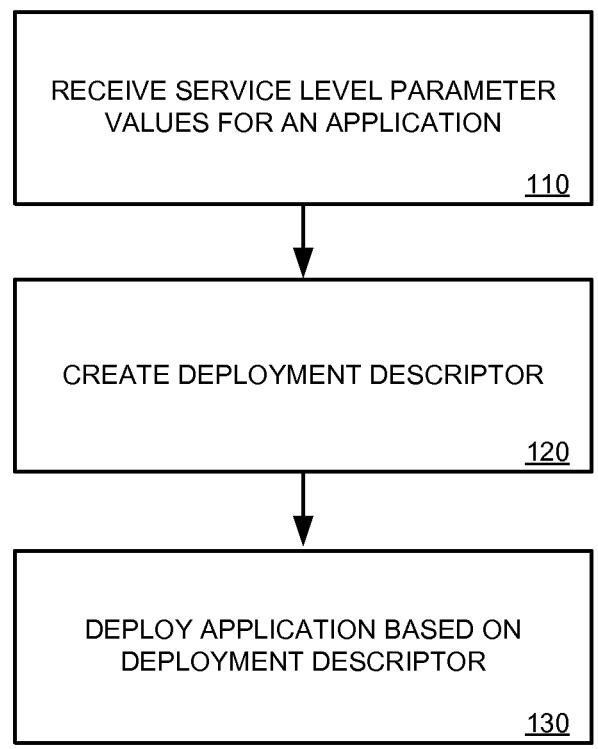
FIG. 1 is a flowchart showing an exemplary method for automating application deployment using deployment descriptors.

The following description is directed to techniques and solutions for automated application service level management using cloud computing technologies. The various techniques and solutions can be used in combination or independently. Different embodiments can implement one or more of the described techniques and solutions.

I. Example Automated Application Service Level Management

Overview

Guaranteeing service levels at application level can be harder than guaranteeing service levels at infrastructure level as there are several factors that influence application quality of service (QoS) characteristics of a software application (application). For example, the workload for an application is usually not constant, and is one of the factors that affect application performance. Applications typically have different performance characteristics for different transactions and the overall application behavior with different transaction mix combinations is generally not linear. This makes it harder to predict application service levels when there are different transaction mixes.

With increasing use of cloud computing technologies, infrastructure resources are shared across multiple applications and so the available network bandwidth, processing capability of processing units (e.g., CPUs), and available memory keeps changing, which also affects application performance.

Automated service level management of software applications, as described herein, involves various techniques, tools, and technologies. Some of these include: multi-layer service level parameter (e.g., as defined by a service level agreement (SLA)) optimization, proactive application layer service level parameter management using techniques such as statistical forecasting (e.g., autoregressive integrated moving average (ARIMA) model), resource requirement and application transaction service level prediction using techniques such as little's law, queuing theory, and non-linear regression, and through techniques applied at application server level (e.g., using platform as a service (PaaS)) that uses techniques such as application migration across an application server cloud.

II. Example Deployment Descriptors

In the techniques and solutions described herein, deployment descriptors can be used to automate deployment of applications, such as web applications in a cloud computing environment. In a specific implementation, a deployment descriptor for a software application includes entries for the components of the software application, entries for dependent components of the software application (e.g., components of other applications that the software application requires to run), and entries defining the service level requirements (at application level) for the software application.

The following is an example deployment descriptor for the software application "Application1."

```
<ApplicationDeploymentDescriptor id = "Application1">
<SLA>
<SLAParameter id = "1" name = "Throughput" TransactionName =
"CreateOrder">
    <SLAValue value = "100" unit = "RequestsPerSecond">
</SLA>
<SLA>
<SLAParameter id = "2" name = "ResponseTime" TransactionName =
"CreateOrder" depends = "1">
    <SLAValue value = "3" unit = "Seconds">
</SLA>
<component id = "Comp1" deployable = "comp1.jar" depends =
"comp2,comp3">
</component>
</ApplicationDeploymentDescriptor>
```

The above example deployment descriptor includes two service level parameters. The first service level parameter is a throughput parameter for the CreateOrder transaction. The service level parameter value is 100 requests per second. This service level parameter defines a requirement for Application1, specifically that Application1 needs to support 100 CreateOrder transactions per second. The second service level parameter is a response time parameter for the Create-Order transaction. This service level parameter defines a requirement for Application1, specifically that Application1 needs to have a response time for the CreatOrder transaction of three seconds or less. The above example deployment descriptor also includes an entry for a component of Application1, "Comp1."

III. Example Methods for Automating Application Deployment Using Deployment Descriptors The techniques and solutions described herein can be used to automate service level management of applications by automating application deployment (e.g., web applications such as cloud computing web applications) using deployment descriptors. In a specific implementation, the application deployment is performed in a cloud computing environment.

FIG. 1 shows an example method 100 for automated application deployment using deployment descriptors. At 110, service level parameter values are received for an application. For example, the service level parameter values can be received from a user via a user interface form. The service level parameters can also be automatically computer generated (e.g., from a database of parameters and/or business rules).

At 120, a deployment descriptor is created from the received service level parameter values 110.

At 130, the application is deployed using, at least in part, the deployment descriptor 120. In a specific implementation, before deploying the application 130 application server and/ or cluster requirements are determined (e.g., CPU, storage, and bandwidth) based on the deployment descriptor. The application server and/or cluster requirements can be determined at one or more levels (e.g., at multiple levels including application level, application server level, and infrastructure level).

Figure 2:
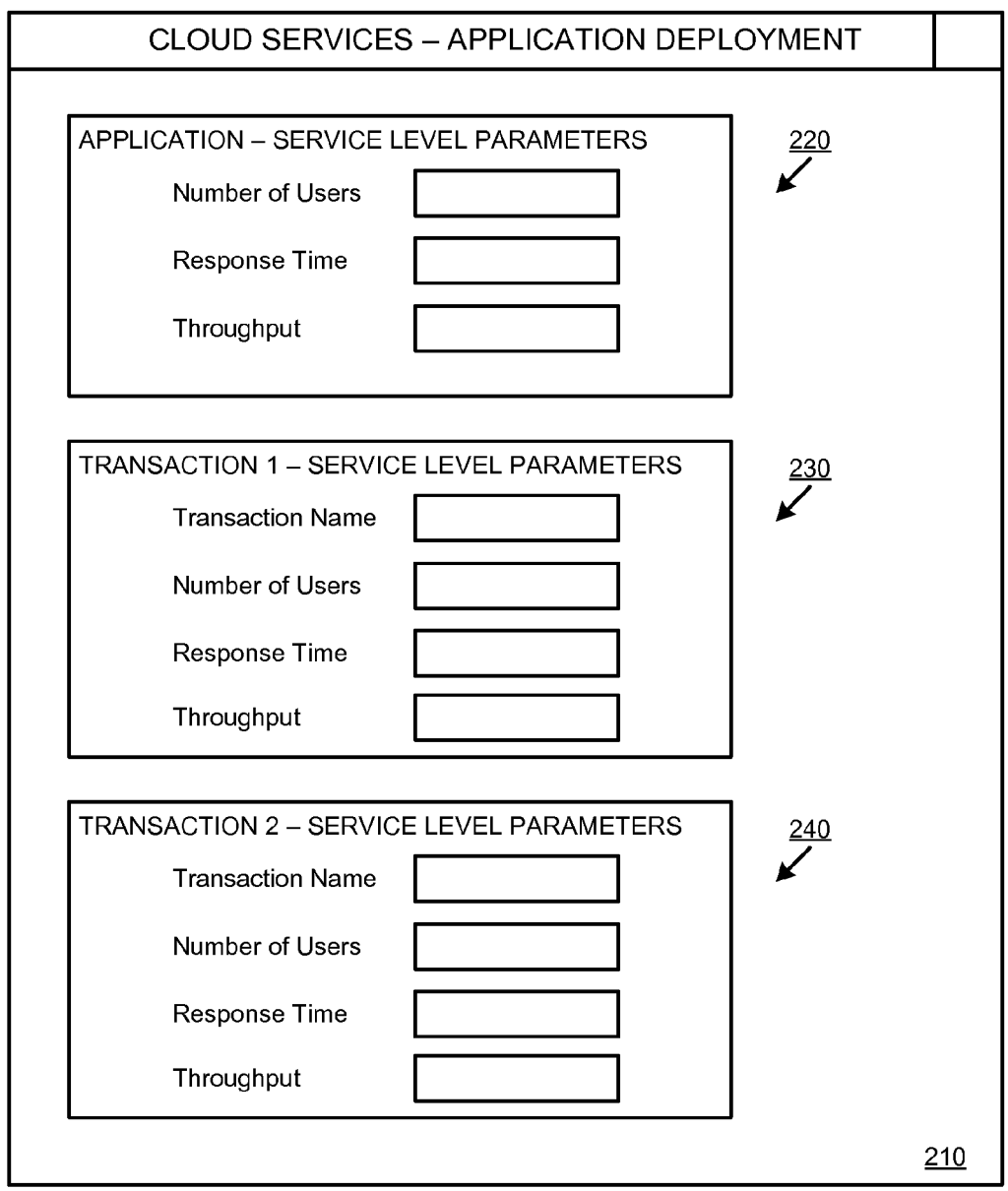
FIG. 2 is a diagram showing an exemplary user interface for entering service level parameters to create a deployment descriptor.

FIG. 2 shows an example user interface 200 for entering service level parameters for an application to create a deployment descriptor for use when automatically deploying the application. The application deployment window 210 can include various types of user interface elements for entering service level parameters for the application.

The application deployment window 210 includes an area for entering general application service level parameter values 220. Specifically, the general application service level parameter values 220 include number of users (e.g., 100), response time (e.g., 3500 msec), and throughput (e.g., 14 overall requests per second).

The application deployment window 210 also includes areas for entering transaction specific service level parameter values for the application. Specifically, at 230, the following service level parameter values for transaction 1 are entered: transaction name (e.g., CreateOrder), number of users (e.g., 50), response time (e.g., 2000 msec), and throughput (e.g., 10 requests per second). At 240, the following service level parameter values for transaction 2 are entered: transaction name (e.g., ModifyOrder), number of users (e.g., 30), response time (e.g., 4000 msec), and throughput (e.g., 10 requests per second).

The application deployment window 210 supports entry of service level parameter values other than, or in addition to, those depicted in the example user interface 200. For example, service level parameter values can be entered for application server level parameters, virtual machine level parameters, and/or infrastructure level parameters.

Figure 3:
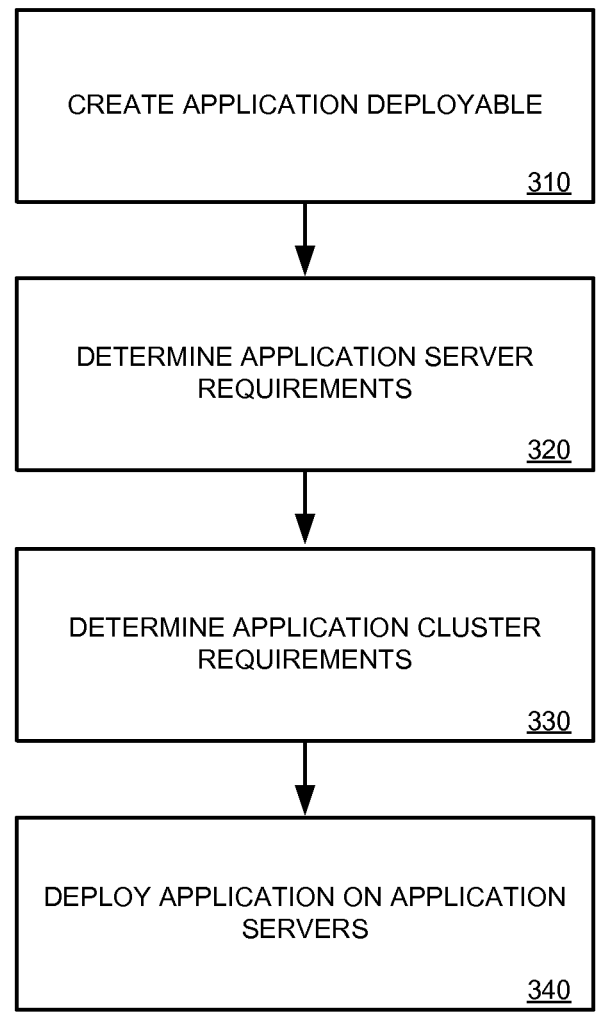
FIG. 3 is a flowchart showing an exemplary method for automating application deployment using an application deployable.

FIG. 3 shows an example method 300 for automating application deployment using an application deployable. At 310, an application deployable is created. In a specific implementation, the application deployable comprises application components, dependent components, and deployment descriptors. Deployment descriptors define various service level parameters for the application. Some example service level parameters for an application include expected response time for various transactions, availability (e.g., uptime), and throughput (e.g., number of transactions of a particular type per second).

At 320, application server requirements are determined based on the deployment descriptors 310. In a specific implementation, the application server requirements comprise a number of application servers (e.g., one or more) as well as the infrastructure resources required by the applications (e.g., CPU, storage, bandwidth, etc.).

At 330, application cluster requirements are determined based on the deployment descriptors 310 and application server requirements 320.

At 340, the application is deployed on the application servers based on the application server requirements 320. Cluster configuration is performed for the application servers based on the cluster requirements 330.

Application server requirements (e.g., 320) can be determined in a variety of ways. For example, application server requirements can be determined using a combination of techniques, such as workload forecasting, prediction of computing resource utilization, and/or optimization rules (e.g., decision tables, thresholds, and multi-factor optimization including cost, suitability, future forecasts, etc.). In some implementations, workload forecasting is calculated, at least in part, using triple exponential smoothing. In some implementations, processor (e.g., central processing unit (CPU)) based prediction includes determining virtual machine allocation based on processor utilization (e.g., overall processor utilization) using techniques such as forced flow law, utilization law, little's law and service demand law (e.g., as described in Section VI, "Example Tools for Providing Automated Application Service Level Management").

In a specific implementation, determining application server requirements comprises identifying the one or more application servers that satisfy a deployment descriptor. The determination includes forecasting workload for at least one transaction supported by the application, predicting computer processor utilization for the least one transaction, and applying optimization rules (e.g., an optimization rule for an 80% threshold that indicates additional computer processor resources need to be added when overall computer processor utilization is above 80%).

Figure 4:
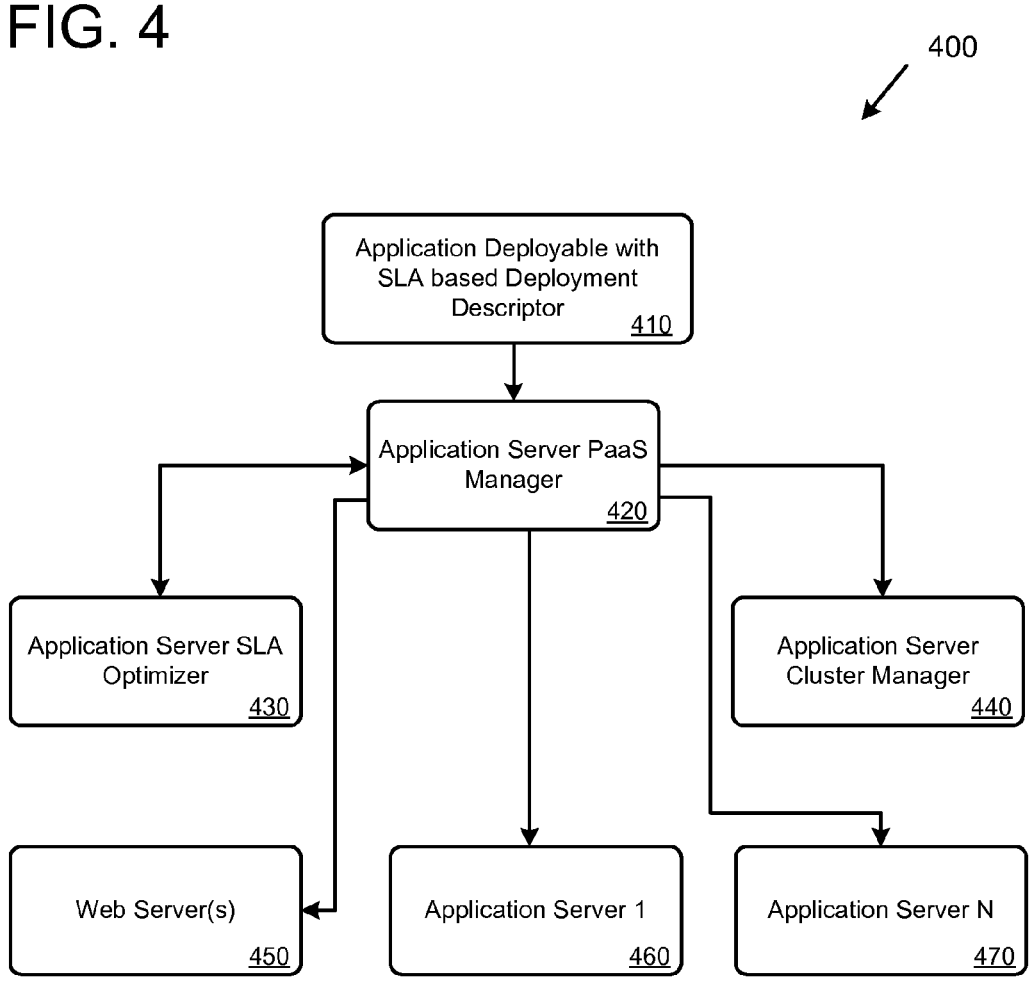
FIG. 4 is a diagram showing example components automating application deployment using deployment descriptors.

FIG. 4 is a diagram showing example components 400 for automating application deployment (e.g., web applications such as cloud computing web applications) using deployment descriptors. In as specific implementation, the components 400 perform the following operations to accomplish application deployment using deployment descriptors. An Application Deployable 410 is created containing the various application components, dependent components, and a deployment descriptor comprising service level parameters (e.g., defined by a SLA) for the application. Examples of application service level parameters are expected response times for the various transactions supported by the application and expected availability of the application.

The Application Deployable 410 with the deployment descriptor is provided to the Application Sever PaaS Manager 420. The Application Server PaaS Manager 420 then utilizes the Application Server SLA Optimizer 430 to identify the number of application servers on which the application is to be deployed and the infrastructure resources (like number of CPUs, memory, disk space etc) needed by the application servers to meet the application service level parameters.

The Application Server SLA Optimizer 430 determines the application server cluster size and the resources needed (e.g., based on the application server and infrastructure requirements).

The Application Server PaaS Manager 420 then selects the application servers that meet the application requirements and deploys the application to those servers. The Application Server PaaS Manager 420 uses the Application Server Cluster Manager 440 to create and update the cluster to enable session failover and to configure other cluster parameters and optimizations.

The Application Server PaaS Manager 420 updates the Web Server(s) 450 to route and load balance the application specific requests to the appropriate application servers (e.g., to Application Servers 1 (460) and N (470)).

The deployed and configured application can then be managed using the various automated management techniques and solutions described herein. For example, the application can be managed using the techniques and solutions described in Section IV ("Example Methods for Automating SLA Management of Applications") and in Section V ("Example Methods for Automating SLA Management of Applications using Dynamic Application Migration").

IV. Example Methods for Automating SLA Management of Applications

The techniques and solutions described herein can be used to automate service level agreement (SLA) management of applications (e.g., web applications such as cloud computing web applications) at a plurality of different levels. The plurality of different levels include application level and at least one lower level. In a specific implementation, the plurality of different levels comprise application level, platform level, and infrastructure level. In another implementation, the plurality of different levels comprise application level, application server level, virtual machine (VM) level, and host level.

Figure 5:
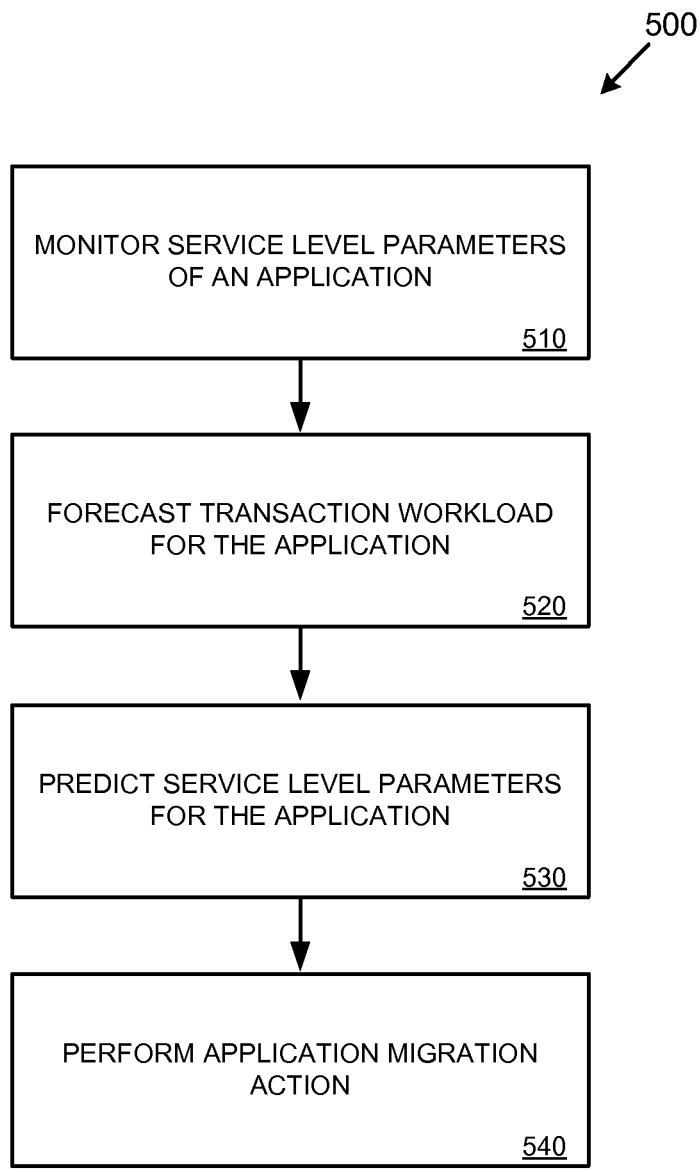
FIG. 5 is a flowchart showing an exemplary method for automating SLA management of applications at a plurality of levels.

FIG. 5 shows an example method 500 for automating SLA management of applications at a plurality of levels. At 510, service level parameters of an application are monitored at application level. The service level parameters can include types of transactions processed by the application, transaction processing rate (e.g., number of transactions of a specific type processed per second), and response time (e.g., time between user submitting a request and receiving a response from the application).

At 520, transaction workload for the application is forecast. In a specific implementation, the transaction workload is forecast based on historical data.

At 530, future service demand for the application is predicted. In a specific implementation, the prediction is based on the transaction workload forecast 520. The result of the prediction 530 is the service demand expected to be placed on the application. For example, the service demand can be in terms of computing resources required by the application (e.g., CPU, storage, bandwidth, etc.).

At 540, an application migration action is performed based on the prediction 530. For example, the application migration action can be to move the application from one cluster of application servers to another, or to add resources to an existing application server cluster.

In a specific implementation, the example method 500 is performed at one or more additional levels (in addition to application level), such as platform level and infrastructure level. When the example method 500 is also performed at platform level and infrastructure level, the monitoring 510 includes monitoring service level parameters at platform level (e.g., database connections and thread usage) and infrastructure level (e.g., CPU usage, storage usage, bandwidth usage). In addition, the forecasting 520 and prediction 530 is performed at platform level and infrastructure level. The migration action 540 includes migration and optimization at platform level and infrastructure level (e.g., migration to different hardware resources and/or optimizing computing resources).

Figure 6:
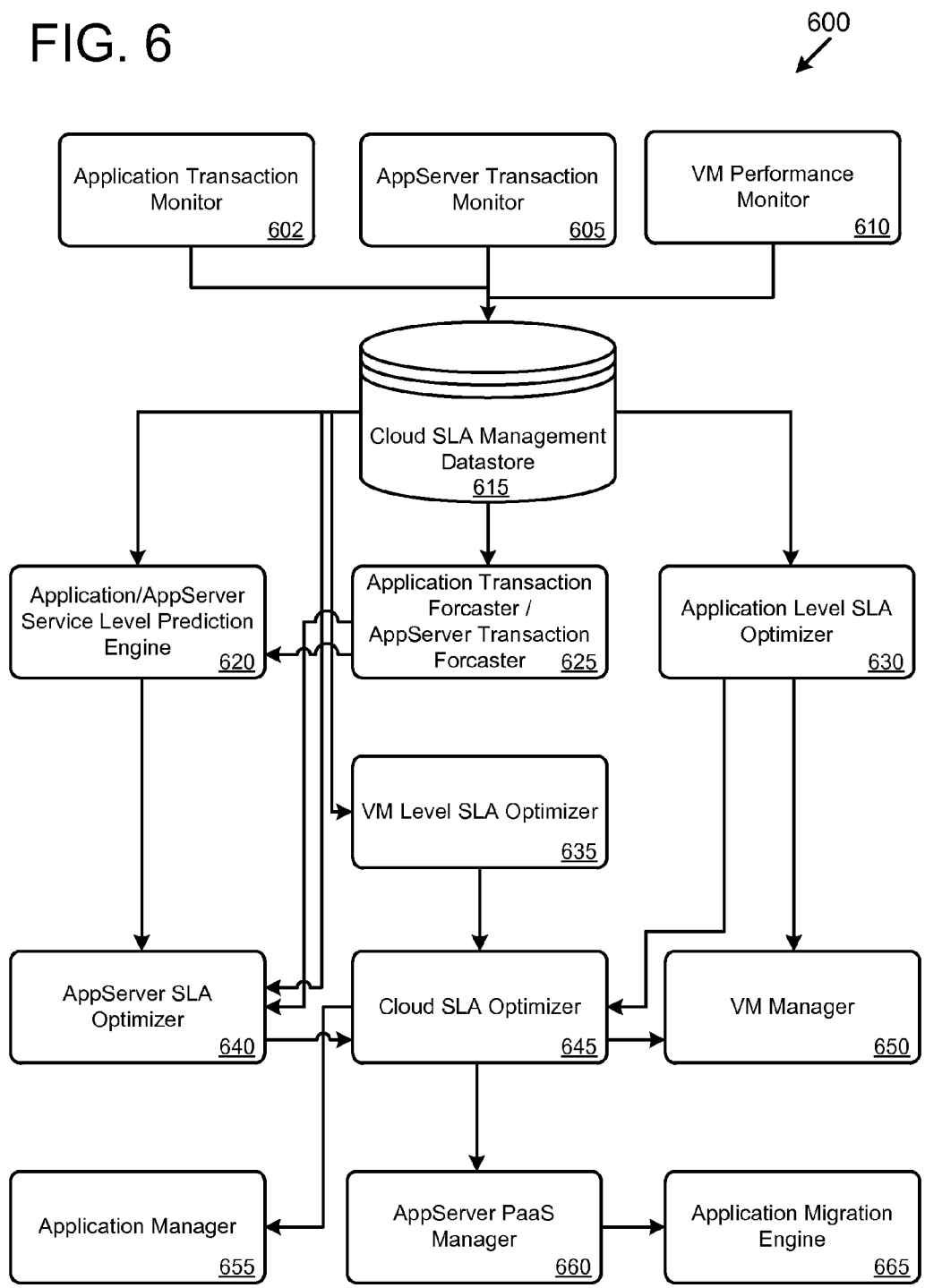
FIG. 6 is a diagram showing example components for automating SLA management of applications at a plurality of levels.

FIG. 6 is a diagram showing example components 600 for automating SLA management of applications at a plurality of levels. The components 600 can be used to perform a method for automating application SLA management of web applications using a combination of application level, platform level, and infrastructure level controls, and using predictive models and workload forecasting.

In as specific implementation, the components 600 perform the following operations to accomplish automated SLA management of applications. The Application Transaction Monitor 602 tracks the incoming requests at application level and identifies the transaction mix and the rate at which requests are received for each transaction.

The Cloud SLA Management Datastore 615 maintains a historical log of the transaction information for individual transactions of each application, server, cluster and data center for a configurable duration with configurable granularity. It also maintains a historical log of application, VM and server performance metrics (such as throughput, CPU utilization, memory utilization, thread utilization, database connection utilization, etc.).

The Application Transaction Forecaster 625 uses statistical regression techniques like ARIMA for forecasting future workloads.

The VM Performance Monitor 610 monitors the CPU utilization of the VM for the server and the individual processes.

The Application Service Level Prediction Engine 620 uses techniques (such as forced flow law, utilization law, little's law, service demand law, and/or linear regression techniques) to calculate the service demand for the different transactions of the different applications. It then uses these, and the output from the Application Transaction Forecaster 625, to forecast the application computing resource (e.g., CPU, storage, bandwidth) consumption.

The VM Manager 650 predicts the future CPU utilizations based on the forecasted workloads.

The VM Level SLA Optimizer 635 uses the metrics data from the Datastore 615 and rules to determine the VM level recommendations, such as addition/deletion of resources (e.g., virtual CPUs), migration of VMs, etc.

The Application Level SLA Optimizer 630 uses the metrics data from the Datastore 615 and rules to determine, at the application level, recommendations such as selection of different implementations of a component or service (for example, pick airline reservation service implementation 1 instead of airline reservation service implementation 2 in an application that has a airline reservation service as one of the services). The Application Level SLA Optimizer 630 uses the information at application level, VM level, and infrastructure level and optimizes the resource consumption by using application level controls provided by the Application Manager 655 (such as migrating the application to other application servers, request throttling, delay introduction, etc.).

The Application Server PaaS (Platform as a Service) Manager 660 provides a scalable PaaS platform enabling migration of applications and load balancing of application transactions, as well as other optimizations.

The Application Migration Engine 665 helps in migrating applications from one application server instance of the application server PaaS platform to another.

The AppServer Transaction Monitor 605 and AppServer Transaction Forecaster 625 monitor transactions at application server level and forecast transaction workloads across multiple applications at application server level.

The AppServer Service Level Prediction Engine 620 predicts transaction service levels across multiple applications at application server level (as described above with regards to Application Service Level Prediction Engine 620).

The App Server SLA Optimizer 640 uses the information at application server level, VM level, and infrastructure level and optimizes resource consumption by using application server level controls provided by the AppServer PaaS Manager 660 like migrating applications across application servers, thread pool allocations, database connection allocations, etc. to manage application server level resources across the applications.

The Cloud SLA Optimizer 645 uses the optimization recommendations at the individual layers (such as those provided by the AppServer SLA Optimizer 640 and VM Level SLA Optimizer 635) and performs a global optimization across the cloud.

The Cloud Resource Budgeting Engine (not pictured) sets the resource consumption budgets for the various layers and the Cloud Controller (not pictured) uses level controls provided by the Cloud Manager (not pictured) (such as performing migration across multiple cloud providers).

V. Example Methods for Automating SLA Management of Applications Using Dynamic Application Migration The techniques and solutions described herein can be used to automate service level agreement (SLA) management of applications (e.g., web applications such as cloud computing web applications) using dynamic application migration.

Figure 7:
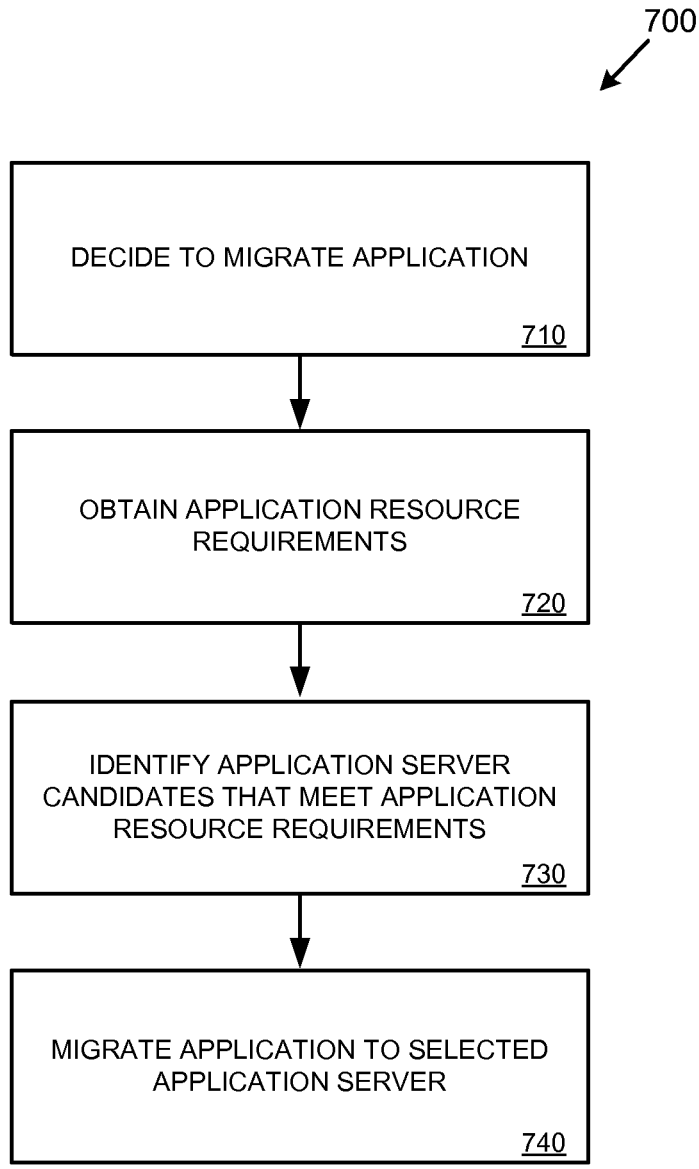
FIG. 7 is a flowchart showing an exemplary method for automating SLA management of applications using dynamic application migration.

FIG. 7 shows an example method 700 for automating SLA management of applications using dynamic application migration. At 710, a decision is made to migrate an application. In a specific implementation, the decision to migrate the application is based, at least in part, on application service level prediction and forecasting, and considers monitoring information obtained at application level, VM level, and infrastructure level.

At 720, application resource requirements are obtained. Some examples of application resource requirements are CPU, storage, bandwidth, application dependencies, etc.

At 730, one or more application server candidates are identified that meet the application resource requirements 720. In a specific implementation, the identified application server candidates 730 are sorted in order of suitability.

At 740, an application server is selected from the candidates 730, and the application is migrated to the selected application server.

Figure 8:
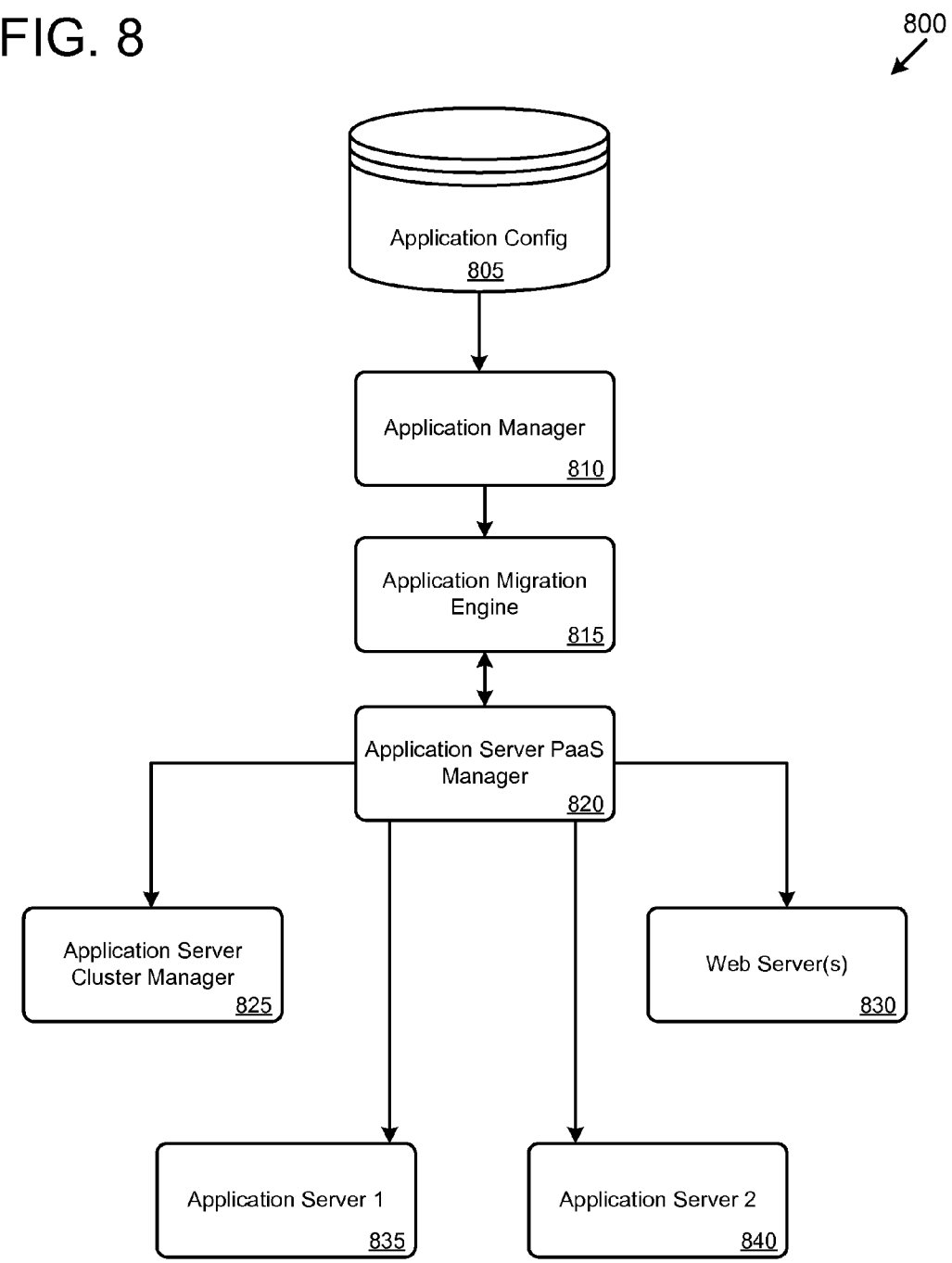
FIG. 8 is a diagram showing example components for automating SLA management of applications using dynamic application migration.

FIG. 8 is a diagram showing example components 800 for automating SLA management of applications using dynamic application migration. In as specific implementation, the components 800 perform the following operations to accomplish automated SLA management of applications using dynamic application migration.

The Application Level SLA Optimizer (e.g., component 630 depicted in FIG. 6) uses information at application level, VM level, and infrastructure level, as well as optimization rules, to decide whether to initiate application migration. The Application Migration Engine 815 then interacts with the various components to accomplish the migration.

The Application Migration Engine 815 queries the Application Manager 810 to get the application resource requirements and internal and external dependencies of the application (e.g., from the Application Config datastore 805). The Application Migration Engine 815 queries the Application Server PaaS Manager 820 to identify all the various application servers that are managed by it (e.g., Application Server 1 (835) and Application Server 2 (840)) which meet the application's resource requirements. The Application Migration Engine 815 uses the information about the application's external dependencies to identify the application servers among those identified that can be provide those dependencies.

The Application Migration Engine 815 then creates a sorting of the identified application servers in the order of the suitability for the given application based on factors such as availability of free resources, compatibility of co-deployed applications, historical usage patterns, etc., and then picks the most suitable application server.

The Application Migration Engine 815 then initiates the deployment of the application on the identified application server while maintaining the order of deployment based on the internal and external dependencies. In the case of J2EE application servers, this involves deploying the web components and the EJB components using the deployment packaging.

The Application Migration Engine 815 then updates the Application Server Cluster Manager 825 to add the newly configured application server to the application cluster.

The Application Migration Engine 815 then updates the Web Server(s) 830 to share the application specific requests to the newly configured application server.

The Application Migration Engine 815 then updates the Web Server(s) 830 to remove the old application server (from which the application is being migrated) so that new application specific requests will no longer be routed to the old application server.

The Application Migration Engine 815 then waits until the existing sessions, in the old application server from which the application is being migrated, are completed.

The Application Migration Engine 815 then initiates removal of the application components from the old application server from which the application is being migrated.

VI. Example Tools for Providing Automated Application Service Level Management

Providing service level management of applications can involve a number of different components and techniques. In a specific implementation, a technique for service level management of applications in a cloud computing environment uses four layers (levels) of optimizations, monitoring, statistical models, prediction, and/or forecasting.

Figure 9:
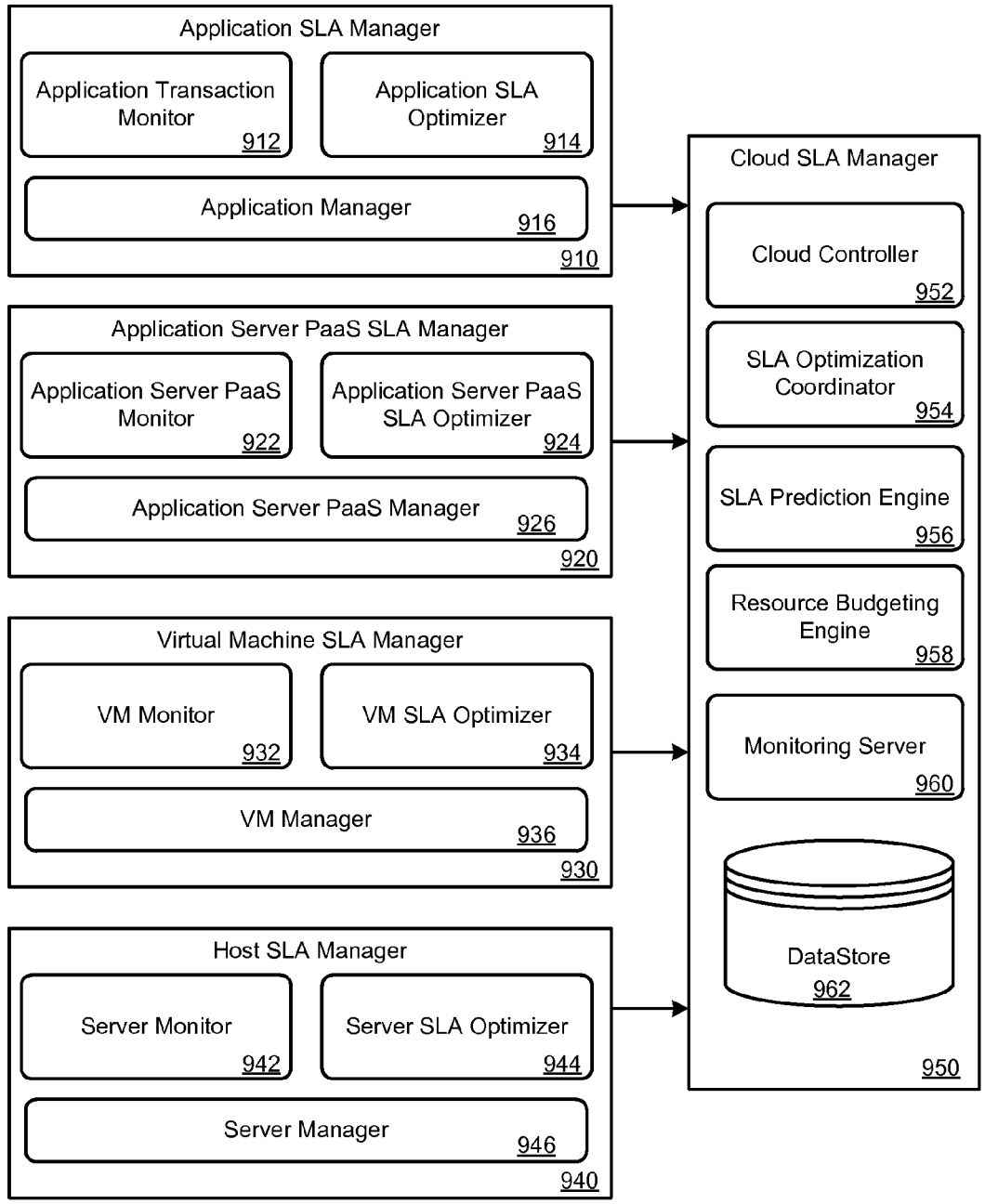
FIG. 9 is a diagram showing an example architecture for providing automated application service level management solutions.

FIG. 9 is a diagram showing an example architecture 900 for providing automated application service level management solutions using four levels. The four levels in the example architecture 900 are: application level 910, application server level 920, virtual machine level 930, and host (infrastructure) level 940. Each of the four levels includes a monitoring component (912, 922, 932, and 942), a SLA optimizer component (914, 924, 934, and 944), and a manager component (916, 926, 936, and 942). The cloud computing environment 950 includes a cloud controller 952, a SLA optimization coordinator 954, a SLA prediction engine 956, a resource budgeting engine 958, a monitoring server 960, and a data store 962.

At application level 910, the application SLA manager performs a whitebox analysis of the applications' transactions for optimizations in SLA management by monitoring and analyzing the different transactions supported by the application and their individual processing and resource needs. It then uses application level controls through the application manager 916 for cost optimization while meeting the SLA cost effectively.

The application transaction monitor 912 supports automated discovery of the various transactions supported by the application through a request monitoring mechanism. For example, for web applications, the application transaction monitor 912 can track the various URLs and accordingly identify the various transactions supported. The application transaction monitor 912 can also be configured with user defined mechanisms for transaction analysis. The application transaction monitor 912 then captures the information about the various transactions, such as the number of requests, overall processing time, etc. The application transaction monitor 912 stores the captured information in a datastore 962. The application SLA optimizer 914 uses techniques (e.g., ARIMA) for regression and time series analysis to forecast the individual transactions and the mix, and the results are used for workload prediction and resource estimation. The application SLA optimizer 914 uses the forecasted values of the individual transaction workloads and predicts the service levels like the response time, throughput, etc. with different combinations of resources and configurations.

In a specific implementation, queuing theory is applied, as described below with reference to FIGS. 10A and 10B, to automating service level prediction of applications in a scenario with shared infrastructure and application servers. The technique is applied without any manual (user) intervention, and is applied continuously to automate computing resource estimation.

Figure 10A:
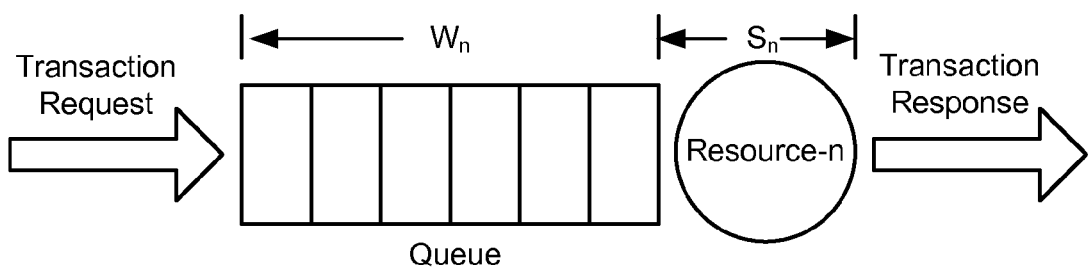
FIG. 10A depicts an example transaction processing diagram indicating overall response time for a transaction.

With reference to FIG. 10A (depicting a prior art queuing and resource diagram), assume that there are 2 applications identified as A1 and A2 with 2 transactions each identified as A1T1, A1T2 and A2T1, A2T2. Also assume that transaction A1T1 uses Resource-n as part of the processing. The overall response time of the transaction is the sum of the service time $S_n$ that the resource takes for processing and the time $W_n$ that the request spends waiting in the queue before it gets processed. Service demand $A1T1D_n$ for transaction A1T1 for resource Rn is the sum of all service times of the transaction for Resource-n.

Applying forced flow law, utilization law, little's law and service demand law, the following equation can be determined to get the service demand of a transaction request based on the observed utilization values of a resource.

$$A1T1D_n = A1T1RU_n / A1T1X_n$$

The above equation assumes an isolated environment with Resource-n processing only A1T1 requests, and $A1T1RU_n$ is the average utilization of Resource-n, and $A1T1X_n$ is the average number of A1T1 requests that are completed per unit of time. Since applications are generally deployed in a shared environment with virtualization, it is not possible to measure $A1T1RU_n$. However, it is possible to identify all the transactions and measure their individual throughputs and the overall resource utilization $RU_n$ of the system using the following equations:

$$RU_n = A1T1RU_n + A1T2RU_n + A2T1RU_n + A2T2RU_n$$

and thus:

$$RU_n = (A1T1D_n * A1T1X_n) + (A1T2D_n * A1T2X_n) + (A2T1D_n * A1T1X_n) + (A1T2D_n * A2T2X_n)$$

Generalizing the above equation, it can be represented in matrix notation as:

$$[RU] = [SD] * [X] \quad \text{(Equation 1)}$$

Where RU is the utilization matrix, SD is the service demand matrix, and X is the throughput matrix. By using the measured values for RU and X, SD can be calculated. The SD matrix for all the application transactions is continuously calculated and updated. This makes the system adaptive to changes in application processing logic as newer versions are released.

The application transaction forecasting engine (a component of the application SLA optimizer 914) uses the historical time series information of the average requests received for each transaction at different time intervals $T_1, T_2, \ldots T_t$, such as $A1T1X_1, A1T1X_2, \ldots A1T1X_n$, to forecast the average requests in future time interval $T_{t+1}$ $A1T1X_{t+1}$. This provides the transaction throughput matrix $[X_{t+1}]$ for a future time $T_{t+1}$.

The application transaction forecasting engine will therefore forecast the future throughput matrix for time $[X_{t+1}]$. Substituting this into Equation 1 gives the predicted resource utilization $[RU_{t+1}]$ for time $T_{t+1}$.

$$[RU_{t+1}] = [SD] * [X_{t+1}] \quad \text{(Equation 2)}$$

The following is an example calculation scenario. In the example calculation scenario, an OrderManagement web application is used to process orders placed via an e-commerce web portal, and a CustomerManagement web application is used to manage customer accounts. Both applications in the example scenario support four transactions, as depicted in Table 1 below.

TABLE 1

Example Transactions

| Application Name | Transaction No. | Transaction Name |
|---|---|---|
| OrderManagement | 1 | CreateOrder |
| | 2 | UpdateOrder |
| | 3 | DeleteOrder |
| | 4 | SearchOrder |
| CustomerManagement | 1 | CreateCustomer |
| | 2 | UpdateCustomer |
| | 3 | DeleteCustomer |
| | 4 | SearchCustomer |

In the example scenario, the applications are deployed on two application servers on two virtual machines with the configuration given below Table 2 below.

TABLE 2

Virtual Machine Configuration

| S. No | Resource Type | Resource Size |
|---|---|---|
| 1 | CPU | 1 |
| 2 | RAM | 1 GB |
| 3 | Storage | 20 GB |

In the example scenario, the two applications (OrderManagement and CustomerManagement) are monitored for four hours from 9 AM to 1 PM on June $28^{th}$, and the average workload for the four transactions of each application, as well as the CPU utilizations, are shown in Table 3 and 4 below.

TABLE 3

Workload and CPU Metrics Measured for OrderManagement App

| Workload (requests per second) | | | | CPU |
|---|---|---|---|---|
| CreateOrder | UpdateOrder | DeleteOrder | SearchOrder | Utilization |
| 5 | 10 | 2 | 10 | 48% |
| 3 | 15 | 3 | 12 | 53.1% |
| 2 | 20 | 2 | 30 | 84.4% |
| 4 | 8 | 1 | 25 | 63.6% |

TABLE 4

Workload and CPU Metrics Measured for CustomerManagement App

| Workload (requests per second) | | | | CPU |
|---|---|---|---|---|
| Create Customer | Update Customer | Delete Customer | Search Customer | Utilization |
| 3 | 8 | 1 | 15 | 25% |
| 1 | 9 | 3 | 30 | 36% |
| 2 | 15 | 1 | 10 | 26.5% |
| 3 | 10 | 2 | 20 | 31.5% |

Using Equation 1 above, the CPU resource service demands for the transactions of the two applications in the example scenario are calculated (using the workload and CPU utilization values from Tables 3 and 4 above) as shown in Table 5 below.

TABLE 5

CPU Service Demand Calculated at Runtime

| Application Name | Transaction Name | CPU Service Demand |
|---|---|---|
| OrderManagement | CreateOrder | 3.2 |
| | UpdateOrder | 1.6 |
| | DeleteOrder | 0.5 |
| | SearchOrder | 1.5 |
| CustomerManagement | CreateCustomer | 1.5 |
| | UpdateCustomer | 1.0 |
| | DeleteCustomer | 0.5 |
| | SearchCustomer | 0.8 |

In the example scenario, workload forecasting is performed for July $1^{st}$ using a forecasting algorithm, such as triple exponential smoothing. The results of the forecasting calculation are depicted below in Table 6.

TABLE 6

Forecasted Workload

| Application Name | Transaction Name | Workload (requests per second) | |
|---|---|---|---|
| | | 9-10AM | 10-11AM |
| OrderManagement | CreateOrder | 10 | 8 |
| | UpdateOrder | 50 | 10 |
| | DeleteOrder | 5 | 2 |
| | SearchOrder | 100 | 40 |
| CustomerManagement | CreateCustomer | 5 | 20 |
| | UpdateCustomer | 10 | 50 |
| | DeleteCustomer | 1 | 2 |
| | SearchCustomer | 20 | 100 |

In the example scenario, using Equation 2 above, the expected number of virtual machines for these forecasted workloads (as depicted in Table 6 above) can be calculated as shown in Table 7 below. The calculation uses a threshold of 80% CPU utilization beyond which the application is deployed on an additional virtual machine. In the example, the application server PaaS cloud has four VMs and the two applications (OrderManagement and CustomerManagement).

TABLE 7

Virtual Machine Allocation

| | Calculated Metric | 9-10AM | 10-11AM |
|---|---|---|---|
| OrderManagement | CPU Utilization Prediction | 264.5% | 102.6% |
| | Number of machines needed | 4 | 2 |
| CustomerManagement | CPU Utilization Prediction | 34% | 161% |
| | Number of machines needed | 1 | 3 |
| Total | Overall CPU Utilization Prediction | 298.5% | 253.6% |
| | Overall number of machines needed | 4 | 4 |

In Table 7 above, the "CPU Utilization Prediction" values are calculated from the "CPU Service Demand" values from Table 5 and the forecasted workload values from Table 6. Using the results of Table 7, overall VM allocations can be performed as follows. For the 9-10 AM timeframe, the OrderManagement application is assigned to four VMs (VM1, VM2, VM3, and VM4) and the CustomerManagement application is assigned to one VM (VM4). For the 10-11 AM timeframe, the OrderManagement application is assigned to two VMs (VM1 and VM2) and the CsutomerManagement application is assigned to three VMs (VM2, VM3, and VM4).

A similar approach (as used above with respect to CPU utilization) can be used to extrapolate the resource requirements for storage, network, etc., and accordingly the deployment choices can be made.

Application transaction performance is dependent on the workload, service demand, and resource utilizations and so can be expressed as a non-linear function of the utilization of the resource. An exponential function is a close approximation of the relationship between application transaction performance and the workload and resource utilization. Therefore, response time of an application transaction A1T1 at a time T+1 can be expressed as a function of its service demand $A1T1D_n$, the utilization of the resources it uses where $RU_n$ denotes the utilization of resource-n and the workload $A1T1X_{t+1}$.

$$A1T1R_{t+1} = C1 + \Sigma C2^*(A1T1D_n) + C3^*e^{(C4^*RU_{t+1}+C5^*A1T1X_{t+1})}$$ (Equation 3)

By observing the transaction response times at different resource utilization levels and workloads and applying non-linear regression, the constants C1, C2, C3, C4 and C5 can be calculated. This enables predicting the application transaction response times using the forecasted workloads and resource utilizations.

Figure 10B:
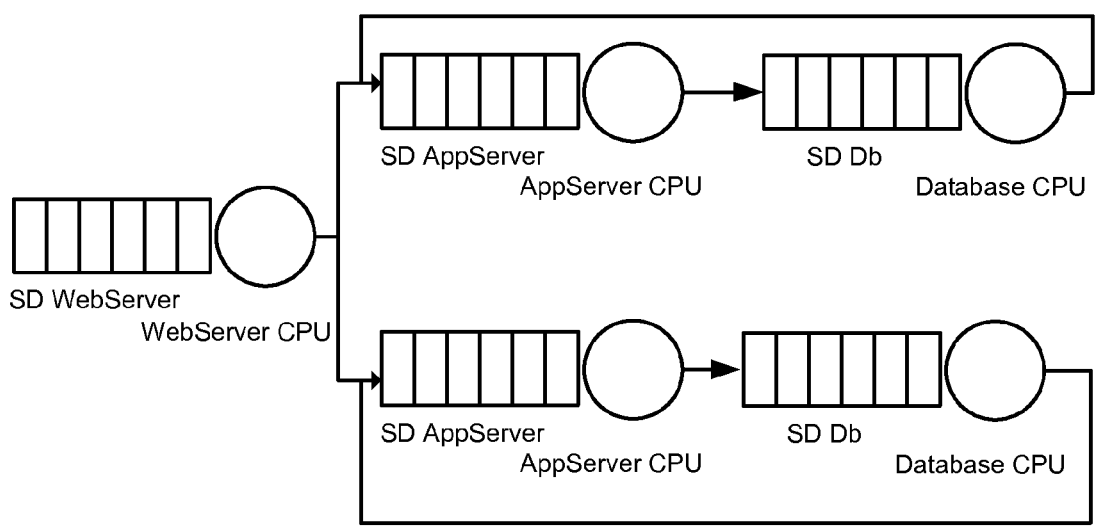
FIG. 10B depicts an example application queuing model.

With reference to FIG. 10B (depicting an example application queuing model), a specific technique includes multiple mechanisms for application service level predictions that uses design models based on queuing theory to predict the application transaction response times. Using the service demand values [SD], the application transaction throughput $[X_{t+1}]$, and the transaction flow across the different resources, the ApplicationServiceLevelPredictionEngine (a component of the application SLA optimizer 914) creates a queuing model, such as the queuing model depicted in FIG. 10B, for a three-tier configuration comprising modeling a web server, two application servers, and two database servers, and predicts the expected service levels of the application transactions.

The Service level of a transaction is a function of the service demand and the service requests received per unit of time as shown in the equation below:

$$SLU = f([X],[SD])$$ (Equation 4)

The function is modeled by the queuing model depicted in FIG. 10B and is used to arrive at the service level with a mix of transactions and resources.

SLA cost optimizations are then applied by solving a cost equation that takes into consideration the profits of meeting service levels, costs of violating service levels, cost of resources consumed, etc., and accordingly determines the different actions.

Assume for application transaction AxTx that AxTxPx represents the profit of meeting the service level objective and AyTyLy represents the loss for application transaction AyTy from failing to meets its service level objective, and assume the total AzTzRU represents the resources consumed by application transaction AzTz per transaction and C represents the cost of a unit of resource. The objective of an application SLA optimizer is to arrive at the application transaction throughputs that best optimizes the equation below, where $AxTxX_{t+1}$ represents the throughput of application transaction AxTx, $AyTyX_{t+1}$ represents the throughput of application transaction AzTz, and $AzTzX_{t+1}$ represents the throughput of application transaction AzTz given the constraint of the available resources.

$$\text{Total Profit} = \Sigma AxTxX_{t+1}^* AxTxPx - \Sigma AyTyX_{t+1}^* AyTyLy - \Sigma AzTzX_{t+1}^* AzTzRU^*C$$

With the constraint that the sum of resource allocations across all the application transactions can't exceed a predefined threshold.

$$\Sigma RU \leq RT(\text{threshold})$$

This optimization equation can be solved using various techniques, such as least mean square error.

In a specific implementation, the objective of the cloud SLA management component 950 is to solve the cost optimization equations for application level, application server level, virtual machine level, and the host level across all the applications and hosts in the cloud.

The cloud SLA management component 950 uses the application transaction forecast and application computing resource prediction inputs from the application manager 916 along with the application server level 920, virtual machine level 930, and host level 940 inputs, and the SLA optimization coordinator 954 helps synchronize the optimization related actions initiated at host level, virtual machine level, application server level, and application levels.

The application manager 916 provides the components for performing actions at application level that can help manage the application computing resource consumption. The application manager 916 helps automate the configuration and deployment of the applications, and helps pick different component implementations and set different thresholds for resource pooling, etc., so that the application behavior and resource consumption can be managed. The application manager 916 also provides mechanisms such as transaction throttling, delay introduction, etc., to manage the throughputs of the transactions given an application deployment configuration.

In a specific implementation, an application server platform as a service (PaaS) cloud is used that includes an application migration engine that migrates applications across the different application server instances so that the computing resource consumption of an application instance can be managed. The application server PaaS manager 920 provides support for automation of application server clustering and application clustering, and so varies the number of application instances that are part of its cluster and the load balancing algorithms to control the distribution of the application transactions across the different instances thereby providing mechanisms for optimizing computing resource consumption while meeting application SLAs at application and application server level.

VII. Example Computing Device

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices. The techniques and solutions described herein can be performed in a cloud computing environment (e.g., comprising virtual machines and underlying infrastructure resources).

Figure 11:
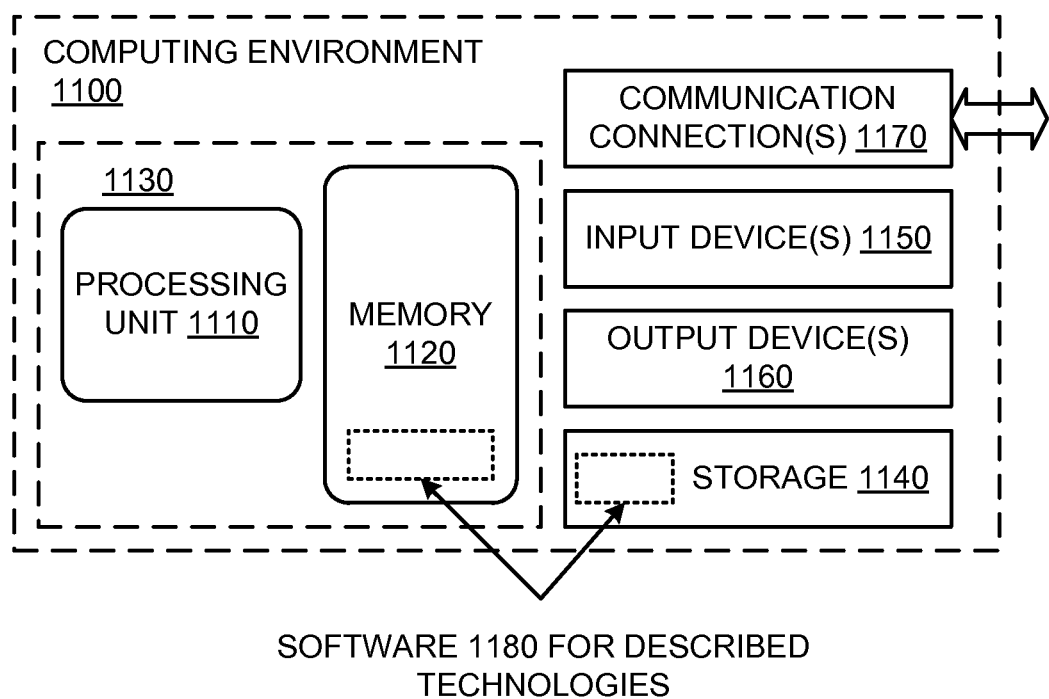
FIG. 11 is a block diagram showing an example computing device.

FIG. 11 illustrates a generalized example of a suitable computing environment 1100 in which described embodiments, techniques, and technologies may be implemented. The computing environment 1100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multi-processor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 11, the computing environment 1100 includes at least one central processing unit 1110 and memory 1120. In FIG. 11, this most basic configuration 1130 is included within a dashed line. The central processing unit 1110 executes computer-executable instructions and may be a real or a virtual processor. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 that can, for example, implement the technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other tangible storage medium which can be used to store information and which can be accessed within the computing environment 1100. The storage 1140 stores instructions for the software 1180, which can implement technologies described herein.

The input device(s) 1150 may be a touch input device, such as a keyboard, keypad, mouse, pen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. The output device(s) 1160 may be a display, printer, speaker, CD-writer, or another device that provides output from the computing environment 1100.

The communication connection(s) 1170 enable communication over a communication medium (e.g., a connecting network) to another computing entity. The communication medium conveys information such as computer-executable instructions, compressed graphics information, or other data in a modulated data signal.

VIII. Example Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 1120 and/or storage 1140. As should be readily understood, the term computer-readable media does not include communication connections (e.g., 1170) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. We therefore claim as our invention all that comes within the scope and spirit of these claims.

I claim:

1. A method, implemented at least in part by a computing device, for automated service level management of applications by deployment of applications in a cloud computing environment using deployment descriptors, the method comprising:
   receiving, by the computing device, values for a plurality of service level parameters for an application, wherein the plurality of service level parameters comprise:
      transaction-specific service level parameters for a plurality of transactions supported by the application, and wherein the transaction-specific service level parameters comprise transaction response time and transaction throughput for each of the plurality of transactions;
   creating, by the computing device, a deployment descriptor based, at least in part, on the received values for the plurality of service level parameters, wherein the deployment descriptor comprises:
      entries for components of the application;
      entries for dependent components of the application, wherein the dependent components comprise components of other applications; and
      entries defining the plurality of service level parameters for the application;
   identifying, by the computing device, one or more application servers in the cloud computing environment that satisfy the deployment descriptor; and
   deploying, by the computing device, the application on the one or more identified application servers to achieve service level management of the application in the cloud computing environment.

2. The method of claim 1 wherein the transaction-specific service level parameters further comprise current workload and current processor (CPU) utilization for the plurality of transactions supported by the application.

3. The method of claim 1 wherein the creating, the identifying, and the deploying are performed automatically by the computing device without user intervention.

4. The method of claim 1 wherein the identifying the one or more application servers that satisfy the deployment descriptor comprises:
   identifying a specific number of application servers needed to provide a level of performance based on the deployment descriptor; and
   configuring computing resources of the specific number of application servers to provide the level of performance based on the deployment descriptor.

5. The method of claim 1 wherein the identifying the one or more application servers that satisfy the deployment descriptor comprises:
   forecasting workload for at least one of the plurality of transaction supported by the application.

6. The method of claim 5 wherein the forecasting is performed, at least in part, using triple exponential smoothing.

7. The method of claim 1 wherein the identifying the one or more application servers that satisfy the deployment descriptor comprises:
   forecasting workload for at least one of the plurality of transaction supported by the application;
   predicting computer processor utilization for the least one transaction; and
   applying optimization rules, wherein the optimization rules comprise a threshold rule indicating that additional computer processor resources are added when overall computer processor utilization is above 80%.

8. The method of claim 1 further comprising:
   based on the deployment descriptor, identifying infrastructure level resources, wherein the infrastructure level resources comprise processor resources, storage resources, and network resources.

9. The method of claim 1 wherein receiving the values for the plurality of service level parameters for the application comprises:
   receiving values for general service level parameters for the application, the general service level parameters comprising: number of users, response time, and throughput;
   receiving values for transaction-specific service level parameters for a first transaction, of the plurality of transactions, supported by the application, the transaction-specific service level parameters for the first transaction comprising: transaction name, number of users, response time, and throughput; and
   receiving a third set of values for transaction-specific service level parameters for a second transaction, of the plurality of transactions, supported by the application, the transaction-specific service level parameters for the second transaction comprising: transaction name, number of users, response time, and throughput.

10. A computing device for automated service level management of applications by automated deployment of applications in a cloud computing environment using deployment descriptors, the computing device comprising:
- a storage; and
- a processing unit, wherein the processing unit is configured for performing operations comprising:
  - receiving values for a plurality of service level parameters for an application, wherein the plurality of service level parameters for the application comprises:
    - general service level parameters for the application; and
    - for each of a plurality of transactions supported by the application, transaction-specific service level parameters comprising transaction response time and transaction throughput;
  - creating a deployment descriptor based, at least in part, on the received values for the plurality of service level parameters wherein the deployment descriptor comprises:
    - entries for components of the application;
    - entries for dependent components of the application; and
    - entries defining the plurality of service level parameters for the application;
  - identifying one or more application servers in the cloud computing environment that satisfy the deployment descriptor; and
  - deploying the application on the one or more identified application servers to achieve service level management of the application in the cloud computing environment.

11. The computing device of claim 10 wherein the service level parameters comprise current workload and current processor (CPU) utilization for the plurality of transactions supported by the application.

12. The computing device of claim 10 wherein the identifying the one or more application servers that satisfy the deployment descriptor comprises:
- identifying a specific number of application servers needed to provide a level of performance based on the deployment descriptor; and
- configuring computing resources of the specific number of application servers to provide the level of performance based on the deployment descriptor.

13. A method, implemented at least in part by a computing device, for automated service level management of applications by automated dynamic migration of applications in a cloud computing environment, the method comprising:
- deciding, by the computing device, to migrate an application, wherein the deciding to migrate the application comprises monitoring current workload and service level parameters of the application, wherein the service level parameters comprise:
  - transaction-specific service level parameters for a plurality of transactions supported by the application, and wherein the transaction-specific service level parameters comprise transaction response time and transaction throughput for each of the plurality of transactions;
- obtaining, by the computing device, application resource requirements of the application, wherein the application resource requirements comprise internal application component dependencies, external application component dependencies, and one or more computing resource requirements;
- identifying, by the computing device, application server candidates that meet the application resource requirements, wherein the identifying comprises sorting the identified application server candidates in order of preference based, at least in part, on the application resource requirements;
- selecting, by the computing device, an application server based on the sorted application server candidates; and
- migrating, by the computing device, the application to the selected application server.

14. The method of claim 13 wherein the deciding to migrate the application comprises:
- calculating service demand for the monitored service level parameters;
- forecasting workload for the application; and
- predicting future values for the service level parameters based on the forecasted workload and the calculated service demand;
- wherein the deciding to migrate the application is based on the predicted future values for the service level parameters.

15. The method of claim 13 wherein the deciding to migrate the application comprises:
- monitoring current service level parameters of the application, wherein the current service level parameters are monitored at a plurality of levels comprising application level, virtual machine level, and infrastructure level.

* * * * *

UNITED STATES PATENT AND TRADEMARK OFFICE
CERTIFICATE OF CORRECTION

PATENT NO.         : 8,645,529 B2
APPLICATION NO.  : 12/950464
DATED            : February 4, 2014
INVENTOR(S)      : Doddavula It is certified that error appears in the above-identified patent and that said Letters Patent is hereby corrected as shown below:

In the Claims:

Column 18, lines 26 and 33, Claim 5 and 7, "transaction" should read -- transactions --.

Column 18, line 34, Claim 7, "the least one" should read -- the at least one --.

Column 18, line 60, Claim 9, "receiving a third set of values" should read -- receiving values --.

Signed and Sealed this
Twenty-third Day of February, 2016

Michelle K. Lee
*Director of the United States Patent and Trademark Office*